(12) United States Patent
Yu et al.

(10) Patent No.: US 12,024,816 B2
(45) Date of Patent: Jul. 2, 2024

(54) KIND OF MULTI-LAYER ARTIFICIAL LEATHER AND A PREPARATION METHOD THEREFOR, AN AUTOMOTIVE SEAT AND AN AUTOMOBILE

(71) Applicant: Canadian General-Tower (Changshu) Co., Ltd, Jiangsu (CN)

(72) Inventors: Dongqing Yu, Jiangsu (CN); Anning Wang, Jiangsu (CN)

(73) Assignee: Canadian General-Tower (Changshu) Co., Ltd., Jiangsu (CN)

( * ) Notice: Subject to any disclaimer, the term of this patent is extended or adjusted under 35 U.S.C. 154(b) by 0 days.

(21) Appl. No.: 17/275,135

(22) PCT Filed: Mar. 10, 2020

(86) PCT No.: PCT/CN2020/078680
§ 371 (c)(1),
(2) Date: Mar. 10, 2021

(87) PCT Pub. No.: WO2021/179187
PCT Pub. Date: Sep. 16, 2021

(65) Prior Publication Data
US 2022/0403589 A1   Dec. 22, 2022

(51) Int. Cl.
*B32B 27/12*   (2006.01)
*B32B 3/26*    (2006.01)
(Continued)

(52) U.S. Cl.
CPC .......... *D06N 3/0006* (2013.01); *B32B 3/266* (2013.01); *B32B 5/024* (2013.01); *B32B 5/263* (2021.05);
(Continued)

(58) Field of Classification Search
CPC .......... B60T 13/10; B60T 17/04; B60T 1/062; B62D 55/06; B62D 55/084; B62D 55/108;
(Continued)

(56) References Cited

U.S. PATENT DOCUMENTS

2018/0105976 A1* 4/2018 Jeon ...................... D06N 3/147

FOREIGN PATENT DOCUMENTS

CN   105970644 A   9/2016
CN   206030650 U   3/2017
(Continued)

OTHER PUBLICATIONS

Yu. Jianyong et al., "Design and Weaving of Multilayer Interlocked Woven Fabrics with Honeycomb Structure)" (Forming Technology of Textiles with High Performance Fibers), Jul. 31, 2007.
(Continued)

*Primary Examiner* — Lawrence D Ferguson
(74) *Attorney, Agent, or Firm* — Dorsey & Whitney LLP

(57) ABSTRACT

An artificial leather includes a resin layer as the surface and a base fabric connected to the resin layer as the substrate. The base fabric comprises at least two monolayer structures arranged in an orderly manner as two laminates. Each monolayer structure is woven with some of the warp yarns and/or weft yarns in such layer or with some of the warp yarns and/or weft yarns in one or more other layers to form a number of connecting points, such that at least two monolayer structures arranged in an orderly manner as two laminates are connected with each other in the weaving process, forming a multi-layer integrated base fabric. The artificial leather incorporates a number of air vent holes distributed in the resin layer and the base fabric in the direction of thickness while retaining mechanical properties of tensile strength and tear resistance.

9 Claims, 2 Drawing Sheets

(51) Int. Cl.
- *B32B 5/02* (2006.01)
- *B32B 5/26* (2006.01)
- *B32B 27/28* (2006.01)
- *B32B 27/30* (2006.01)
- *B32B 27/32* (2006.01)
- *B32B 27/34* (2006.01)
- *B32B 27/36* (2006.01)
- *B32B 27/40* (2006.01)
- *B32B 37/16* (2006.01)
- *B32B 38/00* (2006.01)
- *B32B 38/04* (2006.01)
- *B60N 2/58* (2006.01)
- *D06N 3/00* (2006.01)
- *D06N 3/04* (2006.01)
- *D06N 3/06* (2006.01)
- *D06N 3/12* (2006.01)
- *D06N 3/14* (2006.01)

(52) U.S. Cl.
CPC ......... *B32B 27/12* (2013.01); *B32B 27/283* (2013.01); *B32B 27/285* (2013.01); *B32B 27/304* (2013.01); *B32B 27/308* (2013.01); *B32B 27/32* (2013.01); *B32B 27/34* (2013.01); *B32B 27/36* (2013.01); *B32B 27/40* (2013.01); *B32B 37/16* (2013.01); *B32B 38/0012* (2013.01); *B32B 38/04* (2013.01); *B60N 2/5891* (2013.01); *D06N 3/0013* (2013.01); *D06N 3/042* (2013.01); *D06N 3/045* (2013.01); *D06N 3/06* (2013.01); *D06N 3/12* (2013.01); *D06N 3/123* (2013.01); *D06N 3/125* (2013.01); *D06N 3/128* (2013.01); *D06N 3/14* (2013.01); *B32B 2038/042* (2013.01); *B32B 2260/023* (2013.01); *B32B 2260/046* (2013.01); *B32B 2262/0276* (2013.01); *B32B 2262/062* (2013.01); *B32B 2262/128* (2021.05); *B32B 2305/188* (2013.01); *B32B 2307/54* (2013.01); *B32B 2317/10* (2013.01); *B32B 2327/06* (2013.01); *B32B 2333/00* (2013.01); *B32B 2367/00* (2013.01); *B32B 2371/00* (2013.01); *B32B 2375/00* (2013.01); *B32B 2377/00* (2013.01); *B32B 2383/00* (2013.01); *B32B 2601/00* (2013.01); *B32B 2605/003* (2013.01); *D06N 2201/02* (2013.01); *D06N 2201/042* (2013.01); *D06N 2201/10* (2013.01); *D06N 2209/103* (2013.01); *D06N 2209/123* (2013.01); *D06N 2211/28* (2013.01); *D06N 2213/04* (2013.01)

(58) Field of Classification Search
CPC ............ B62D 55/125; B62D 55/24; B32B 2038/042; B32B 2260/023; B32B 2260/046; B32B 2262/0276; B32B 2262/062; B32B 2262/128; B32B 2305/188; B32B 2307/54; B32B 2317/10; B32B 2327/06; B32B 2333/00; B32B 2367/00; B32B 2371/00; B32B 2375/00; B32B 2377/00; B32B 2383/00; B32B 2601/00; B32B 2605/003; B32B 27/12; B32B 27/283; B32B 27/285; B32B 27/304; B32B 27/308; B32B 27/32; B32B 27/34; B32B 27/36; B32B 27/40; B32B 3/266; B32B 37/16; B32B 38/0012; B32B 38/04; B32B 5/024; B32B 5/263; B32B 2250/03; B32B 2250/04; B32B 2262/12; B32B 2262/14; B32B 2266/0235; B32B 2270/00; B32B 2307/724; B32B 2307/7265; B32B 2307/732; B32B 25/10; B32B 25/20; B32B 27/065; B32B 27/20; B32B 27/22; B32B 27/322; B32B 5/06; B32B 5/08; B32B 5/18; B32B 5/245; B32B 5/26; B32B 7/02; B32B 7/09; B32B 7/12; B60N 2/5891; B60N 2/58; D06C 11/00; D06N 2201/02; D06N 2201/042; D06N 2201/10; D06N 2209/103; D06N 2209/123; D06N 2211/28; D06N 2213/04; D06N 3/0006; D06N 3/0013; D06N 3/042; D06N 3/045; D06N 3/06; D06N 3/12; D06N 3/123; D06N 3/125; D06N 3/128; D06N 3/14; D06N 3/0004; D06N 3/0015; D06N 3/0036; D06N 3/0054; F41H 7/005; F41H 7/02; F41H 7/042; F41H 7/044; F41H 7/048; F41H 7/04; D03D 1/00; D03D 15/00; D03D 15/283; D03D 15/292; D06M 17/00; D10B 2331/04; D10B 2505/12; F42D 5/04

See application file for complete search history.

(56) References Cited

FOREIGN PATENT DOCUMENTS

| | | |
|---|---|---|
| CN | 210116255 U | 2/2020 |
| JP | 2003251770 A | 9/2003 |

OTHER PUBLICATIONS

International Search Report and Written Opinion for International Patent Application No. PCT/CN2020/078680, dated Nov. 26, 2020, 9 pages.

* cited by examiner

KIND OF MULTI-LAYER ARTIFICIAL LEATHER AND A PREPARATION METHOD THEREFOR, AN AUTOMOTIVE SEAT AND AN AUTOMOBILE

CROSS-REFERENCE TO RELATED APPLICATION

This application is a national stage application under 35 U.S.C. § 371 of International Application No. PCT/CN2020/078680 filed 10 Mar. 2020, entitled "A kind of multi-layer artificial leather and a preparation method therefor, an automotive seat and an automobile." The contents of this application is hereby incorporated herein by reference in its entirety for all purposes.

TECHNICAL FIELD

The invention relates to the technical field of automotive interiors, in particular to a multi-layer artificial leather and a method for the preparation thereof, and an automotive seat and an automobile incorporating said multi-layer artificial leather.

BACKGROUND ART

The leather fabric is an important material for the production of automotive seats. Leather fabric is characterized as exhibiting the advantages of high breathability and comfortableness, and it is very popular with consumers. The significant number of pollutants generated during leather processing, impose a serious impact on the environment. Moreover, the leather fabric has a number of disadvantages, such as high price, low utilization and scarcity.

Artificial leather fabrics have many advantages, such being environmentally friendly, low price and inexhaustibility. Moreover, owing to the state-of-the-art manufacturing technology, artificial leather is produced to be as comfortable and beautiful as genuine leather. Therefore, industry insiders hope to use artificial leather fabrics in place of the genuine leather fabric. However, artificial leather has nonnegligible disadvantage, i.e., it has poorer breathability than genuine leather. The increasingly higher demand by people for vehicle riding comfort has made it imperative to improve the breathability of artificial leather so that artificial leather can develop into a perfect substitute for genuine leather. To this end, insiders consider punching holes in artificial leather, but the strength of artificial leather will decrease sharply after holes are punched in it. Still worse, when there are dense holes in it, artificial leather will be very easy to damage or even become unusable.

SUMMARY OF THE INVENTION

Based on the above-referenced present situation, the main aim of the invention is to provide a kind of multi-layer artificial leather and a preparation method therefor, that can be incorporated in an automotive seat and an automobile to solve the problems of existing prior art artificial leather cited herein.

To achieve the above-stated aim, the invention adopts the following technical scheme:

In a first aspect, the present invention disclosed herein is an artificial leather that comprises a resin layer as the surface and a base fabric connected to the resin layer as the substrate. The base fabric comprises at least two monolayer structures arranged in an orderly manner such as two laminates, and each monolayer structure is woven from warp yarns and weft yarns in such layer. Each monolayer structure is woven with some of the warp yarns and/or weft yarns in such layer or with some of the warp yarns and/or weft yarns in one or more other layers to form a number of connecting points, such that at least two monolayer structures arranged in an orderly manner as two laminates are connected with each other in the weaving process, forming a multi-layer integrated base fabric. The artificial leather incorporates with a number of air vent holes distributed in the resin layer and the base fabric in the direction of the thickness.

In one embodiment of the invention, the warp yarns and weft yarns in each of the monolayer structures form one or more of the following: plain weave structure, twill weave structure and satin weave structure.

In another embodiment of the invention, the warp yarns and weft yarns are polyester yarns and/or CVC yarns, respectively;

In another embodiment of the invention, the warp yarns and weft yarns are made of at least one of the following: sea-island filaments, 32 staple yarns, 40 staple yarns and long fiber yarn DTY.

In another embodiment of the invention: the outermost monolayer structure in the base fabric positioned the farthest from the resin layer is the first surface layer, while the innermost outermost monolayer close to the resin layer is the second surface layer, at least one of the warp yarns and weft yarns in the first surface layer are made of sea-island filaments, and that the base fabric incorporates a brushed structure on one side of the first surface layer, and the resin layer is glued to the second surface layer.

In another embodiment of the invention, the base fabric comprises two or three monolayer structures.

In another embodiment of the invention, the resin layer is a PVC layer, PU layer, polyolefin layer, halogenated polyolefin layer, polyacrylic acid layer, polypropylene ester layer, silicone rubber layer, polyether layer, polyester layer or polyamide layer.

In another embodiment of the invention, the thickness ratio between the base fabric and the resin layer is 0.7:2.0.

In another embodiment of the invention, the thickness of the base fabric is 0.4 mm~0.75 mm.

In another aspect, the present invention disclosed herein is a method for producing artificial leather (the "preparation method"). Said preparation method comprises the steps of:

S1: Adopting at least two groups of warp yarns and weft yarns, and weaving each group of warp yarns and weft yarns into a monolayer structure so as to form at least two monolayer structures, wherein each of the monolayer structures is woven with some of the warp yarns and/or weft yarns in such layer or with some of the warp yarns and/or weft yarns in one or more other layers to form a number of connecting points, so that at least two monolayer structures arranged in an orderly manner as two laminates are connected with each other in the weaving process, forming a multi-layer integrated base fabric;

S3: Bonding the base fabric and the resin layer together form an artificial leather;

S5: Punching holes in the artificial leather to form a number of air vent holes distributed in the resin layer and the base fabric in the direction of the thickness.

In one embodiment of the preparation method of the invention, there is one more step between S1 and S3, as follows:

S2: Polishing one surface of the base fabric so as to form a base fabric with a brushed structure incorporated on the surface; at least one of the warp yarns and weft yarns in the monolayer structure where the brushed structure is located is made of sea-island yarns;

The bonding of S3 is achieved by a step of: gluing the other surface of the base fabric to the resin layer to form the artificial leather.

In another embodiment of the preparation method of the invention, there is one more step between S3 and S5, as follows:

S4: Polishing the non-bonded surface of the base fabric so as to form a base fabric with a brushed structure incorporated on the surface; at least one of the warp yarns and weft yarns in the monolayer structure where the brushed structure is located is made of sea-island yarns.

In another aspect, the present invention disclosed herein is an automotive seat comprising any of the embodiments of artificial leather described herein.

In another aspect, the present invention disclosed herein is an automobile that comprises the automotive seat described herein.

The mechanical properties of the artificial leather provided by the disclosure herein, such as tensile strength and tear resistance, can be enhanced by providing the artificial leather with a multi-layer base fabric layer and connecting different monolayer structures to each other by weaving technology. Even if it is applied to automotive seats and is therefore punched, the artificial leather described herein remains able to maintain its mechanical properties, such as tensile strength and tear resistance, as unchanged, and its usability is virtually unaffected, thereby improving the riding comfort of the automotive seat described herein, and replacing the genuine leather fabric. Moreover, since it comprises multiple laminates connected with one another through warp yarns and weft yarns, the base fabric is virtually undamaged even if it is polished or processed in other ways in the direction of thickness. Moreover, due to the fact that much less pollution is produced in the manufacturing process of this kind of artificial leather than in the course of processing genuine leather, the artificial leather of the invention can better meet environmental protection laws and standards.

DESCRIPTION OF THE DRAWINGS

The preferred embodiments of the invention will be described by reference to the following drawings. In the drawings.

DETAILED DESCRIPTION

The invention is described below based on various embodiments, however there are more embodiments of the invention than are enumerated herein. In the description of the details of the invention herein, some specific details are described in detail. To avoid confusing the essence of the invention, the methods, processes, procedures or components well known in the art are not described in detail herein.

In addition, those of ordinary skill in the art will recognize that all of the drawings provided herein are for illustrative purposes only, and that the drawings are not necessarily drawn to scale.

Unless explicitly stated or set out in the context, the terms "comprising", "contain" and "include", as well as similar words and phrases, in herein should be interpreted as inclusive rather than exclusive or exhaustive; in other words, these terms, as well as similar words and phrases, mean "include but not limited to".

References are made herein to numerical designations. All numerical designations, e.g., dimensions and ratios, including ranges, are approximations that typically may be varied (+) or (−) by increments of 0.1, 1.0, or 10.0, as appropriate. All numerical designations may be understood as preceded by the term "about". The singular form "a", "an", and "the" includes plural references unless the context clearly dictates otherwise. All publications cited herein, as well as the priority document, are incorporated herein by reference in their entirety.

In the description of the invention herein the terms "first" and "second" are applied for descriptive purposes only and do not indicate or imply relative importance. Moreover, in the description of the invention herein "a number of" or "multiple/plurality" means two or more.

The invention is an artificial leather that can be incorporated in an automobile, such as in an automotive seat. The automotive seat fabric can be comprised of artificial leather.

Figure 1:
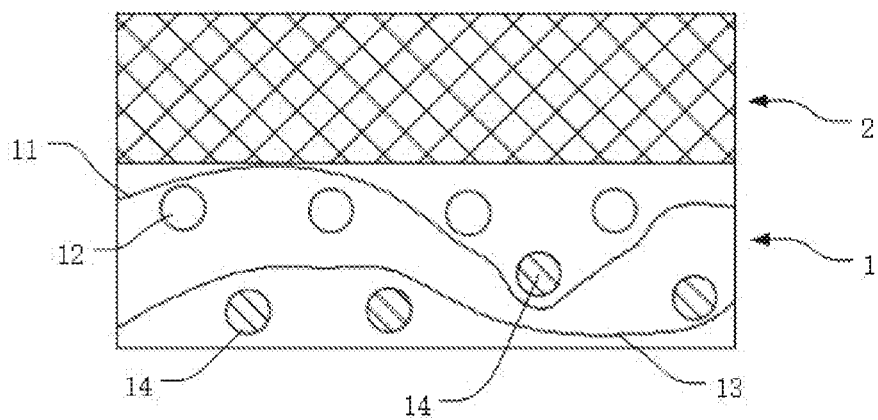
FIG. 1 shows a cross-sectional view of the artificial leather of the invention in accordance with one embodiment of the invention.
Figure 2:
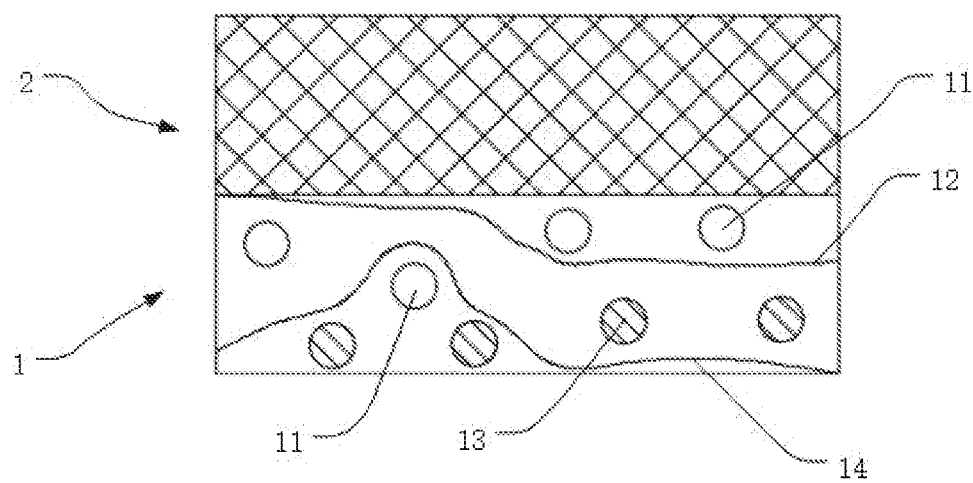
FIG. 2 shows a cross-sectional view of the artificial leather of the invention in accordance with one embodiment of the invention.
Figure 3:
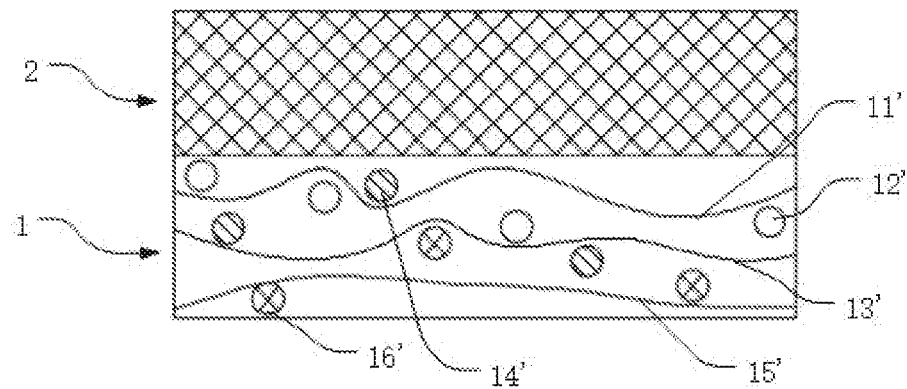
FIG. 3 shows a cross-sectional view of the artificial leather of the invention in accordance with one embodiment of the invention.

In view of the severe environmental pollution created by processing leather and the extremely poor mechanical properties of conventional artificial leather, such as very low tensile strength and tear resistance, caused by hole punching, which makes the artificial leather unusable in automotive seats, the invention herein is an artificial leather. As shown in FIGS. 1-3, the artificial leather of the invention consists of a resin layer as the surface and a base fabric connected to the resin layer as the substrate. The resin layer 2 and the base fabric 1 can be connected to each other as two laminates. The base fabric 1 comprises at least two monolayer structures arranged in an orderly manner as two laminates, such as two monolayer structures, three monolayer structures or more monolayer structures. Each monolayer structure is woven from the warp yarns and weft yarns in such layer, i.e., there are a group of warp yarns and weft yarns (for example, inner warp yarn 11 and inner weft yarn 12, surface warp 11 and surface weft yarn 14, first warp yarn 11' and first weft yarn 12', second warp yarn 13' and first weft 14', third warp yarn 15' and third weft yarn 16'). Each monolayer structure is woven with some of the warp yarns and/or weft yarns in such layer or with some of the warp yarns and/or weft yarns in one or more other layers to form a number of connecting points. In one embodiment of the invention, each monolayer structure can be woven with some of the warp yarns in such layer thereof or with some of the weft yarns in one or more other layers to form a number of connecting points; in another embodiment of the invention, each monolayer structure can be woven with some of the weft yarns in such layer or with some of the warp yarns in on or more other layers to a form number of connecting points; or each monolayer can be woven with the one or more other layers by both of the above-referenced methods to form a number of connecting points, such that at least two monolayer structures arranged in an orderly manner as two laminates are connected with each other in the weaving process, forming a multi-layer integrated base fabric. In other words, for any two monolayer structures, the warp yarns and weft yarns in the first monolayer structure are defined as the first warp yarns and first weft yarns, respectively; the warp yarns and weft yarns in the second monolayer structure are defined as the second warp yarns and second weft yarns, respectively. In embodiments of the invention: some of the first warp yarns can be woven with some of the second weft yarns; some of the first weft yarns can be woven with some of the second warp yarns; or some of the first weft yarns can be woven with some of the second warp yarns while some of the second weft yarns can be woven with some of the first warp yarns to form connecting points between the two monolayer structures so that the two monolayer structures may be connected together. Furthermore, additional monolayer structures may be connected together by weaving technology in this manner. It is worth noting that these two monolayer structures comprise virtually adjacent monolayer structures or nonadjacent monolayer structures; when more than two monolayer structures are provided, the warp yarns and weft yarns in one monolayer structure can be woven with the warp yarns and weft yarns in the two or more monolayer structures. Multiple layers may be woven in the invention in this manner, even through details for all such multiple lawyers are not described herein. These monolayer structures can be connected together by any weaving technology to form a multi-layer integrated base fabric.

In the artificial leather of the invention, the base fabric is provided as a multi-layer integrated base fabric. Furthermore, the monolayer structures in the invention are not connected together by bonding, sewing or other techniques, but by weaving technology. In one embodiment of the invention, the base fabric can be woven from yarns one at a time in this manner, thereby enhancing the mechanical properties of the artificial leather, such as tensile strength and tear resistance; in another embodiment of the invention, the connection between the monolayer structures can be made more reliable in the weaving process, thus further enhancing the mechanical properties of the artificial leather, such as tensile strength and tear resistance; moreover, since it comprises multiple laminates connected with one another through warp yarns and weft yarns, the base fabric is virtually undamaged even if it is polished or processed in other ways in the direction of thickness. Moreover, due to the fact that much less pollution is produced in the manufacturing process of the artificial leather of the invention than in the course of processing of genuine leather, the invention can better meet environmental protection laws and standards.

The multi-layer structure improves the stability of the mechanical properties of the artificial leather of the invention, especially the stability of tensile strength and tear resistance after hole-punching. Whereas, the mechanical property of prior art artificial leather with a single-laminate base fabric, become poorer and unstable after hole-punching.

Moreover, there are a number of air vent holes provided in the artificial leather of the invention in the direction of thickness, distributed in the resin layer and base fabric. That is, such air vent holes penetrate through the entire artificial leather.

After holes are punched in the artificial leather of the invention, the monolayer structures remain connected with each other or one another because the monolayer structures are connected with each other or one another by weaving technology, and the weave points in each monolayer structure (the interfaces between the warp yarns and weft yarns in the same monolayer structure) may misalign with the weave points in the other monolayer structure(s), i.e., only one monolayer structure is disconnected in the holes; moreover, the warp yarns and weft yarns in each monolayer structure also misalign with each other to some extent, so all the warp yarns and weft yarns in each monolayer structure cannot be broken when holes are punched. Therefore, although this kind of artificial leather is provided with air vent holes, its mechanical properties, such as tensile strength and tear resistance, remain high and its application performance is virtually unaffected. Besides, since the artificial leather of the invention is provided with air vent holes, its breathability is improved. When the artificial leather of the invention is applied to an automotive seat for a vehicle, the breathability of the seat can be improved. Especially, for some automobiles, where there is an air louver provided under each seat, air can be delivered quickly to the surface of the seat through the air louver, thereby further enhancing the riding comfort.

Specifically, the number of air vent holes is not limited, for example, ten, twenty, or fewer or more air vent holes can be incorporated in the artificial leather. In an embodiment of the invention, to achieve a more elegant appearance, preferably, a number of air vent holes are arranged in a certain order, such as arranged in the shape of a preset pattern. A particular shape for the air vent holes is not specifically defined for the invention, and multiple shapes are possible. Such air vent holes can be circular holes, square holes or holes of other shapes.

It should be noted that although the artificial leather of the invention, as described herein, is disclosed to be incorporated in an automotive seat, the artificial leather of the invention can have additional uses, e.g., it can be applied to other automotive interiors or used in other fields, such as home seats and even beds, etc.

Understandably, the number and density of the warp yarns and weft yarns in a monolayer structure, which can be set as required, are not defined in the invention are unbounded.

The warp yarns and weft yarns in each of the monolayer structures form one or more of the following: plain weave structure, twill weave structure and satin weave structure. That is to say, the warp yarns and weft yarns in any two monolayer structures can form the same structure or different structures, while the warp yarns and weft yarns in one monolayer structure can also form a varied structure, wherein the structure differs in various portions of such monolayer. In an embodiment invention incorporating more than two monolayer structures, the warp yarns and weft yarns in some of the monolayer structures can form the same structure, while the warp yarns and weft yarns in the rest monolayer structures can form the same structure; or the warp yarns and weft yarns in any two monolayer structures can form different structures. For example, the warp yarns and weft yarns in one of the monolayer structures can form a plain weave structure, while the warp yarns and weft yarns in the other monolayer structures can form a satin weave structure. The afore-referenced structures, namely plain weave structure, twill weave structure and satin weave structure, are not detailed herein, because the plain weave structure, twill weave structure and satin weave structure formed in accordance with conventional weaving processes that are incorporated herein by reference.

In the embodiments of the invention shown in FIG. 1 and FIG. 2, the multi-layer base fabric 1 comprises two monolayer structures. The two monolayer structures are denoted as the surface layer and the inner layer respectively. The monolayer structure bonded to the resin layer 2 can be denoted as the inner layer, while the other monolayer structure is denoted as the surface layer. The warp yarns and weft yarns in the inner layer are denoted as inner warp yarn 11 and inner weft yarn 12; the warp yarns and weft yarns in the surface layer are denoted as surface warp yarn 13 and surface weft yarn 14. In the embodiment of the invention shown in FIG. 1, when the outer surface 14 and the surface warp 13 are woven together, they are also woven with the inner layer; in the embodiment of the invention shown in FIG. 2, when the warp 11 and inner weft 12 are woven together, they are also woven with the inner layer.

In another embodiment of the invention, the multi-layer base fabric 1 comprises three monolayer structures, which are the first monolayer structure, second monolayer structure and third monolayer structure, respectively. As shown in FIG. 3, the warp yarns and weft yarns in the first monolayer structure are denoted as the first warp yarn 11' and the first weft yarn 12'; the warp yarns and weft yarns in the second monolayer structure are denoted as the second warp yarns 13' and the second weft yarns 14'; the warp yarns and weft yarns in the third monolayer structure are denoted as the third warp yarns 15' and the third weft yarns 16'. In such an embodiment of the invention, when the second weft yarns 14' and the second warp yarns 13' are woven together, they are also woven with the first monolayer structure; when the third weft yarns 16' and the third warp yarns 15' are woven together, they are also woven with the second monolayer structure; the first warp yarns 11' are also woven with the second monolayer structure while the second warp yarns 13' are also woven with the third monolayer structure (not shown in FIG. 3).

It should be noted that although FIG. 1 and FIG. 3 show an embodiment in which the warp yarns in one monolayer structure are woven with the weft yarns in the other monolayer structure(s), respectively, while FIG. 2 shows an embodiment in which the weft yarns in one monolayer structure are woven with the warp yarns in the other monolayer structure(s), in fact, in the embodiments of the invention shown in FIG. 1 and FIG. 3, the weft yarns can also be woven by the method provided in the embodiment of the invention shown in FIG. 2; and additionally in the embodiment of the invention shown in FIG. 2, the warp yarns can also be woven by the method provided in the embodiment of the invention shown in FIG. 1. For example, in the embodiment of the invention shown in FIG. 1, the surface warp yarns and inner weft yarns can be woven together by the method provided in FIG. 2.

In each monolayer structure, the warp yarns and the weft yarns may be formed of the same material or of different materials. In one embodiment of the invention, the warp yarns and weft yarns are polyester yarns and/or CVC yarns, respectively. In a preferred embodiment of the invention, the warp yarns and weft yarns are formed of one or more of the following: sea-island filaments, 32 staple yarns, 40 staple yarns and long fiber yarn DTY. In an embodiment of the invention incorporating a base fabric made of sea-island filaments, the base layer feels soft, drapes well, and has light and thin texture, good breathability and water resistance, and high strength, far superior to natural chamois leather. It should be noted that although only polyester yarns and CVC yarns are enumerated above, more kinds of yarns can be used as warp yarns and weft yarns in the invention, such as 150 d, 100 d, 75 d and 21 sPC yarns.

In a preferred embodiment of the invention, the two outermost monolayer structures in the base fabric are the first surface layer and the second surface layer, respectively, i.e., the outermost monolayer structure in the base fabric positioned farthest from the resin layer is the first surface layer, while the innermost outermost monolayer close to the resin layer is the second surface layer, and at least one of the warp yarns and weft yarns in the first surface layer are made of sea-island filaments; moreover, the base fabric is provided with a brushed structure incorporated on one side of the first surface layer, while the resin layer is bonded to the second surface layer. In an embodiment of the invention, wherein two monolayer structures are provided, as shown in FIG. 1 and FIG. 2, in the base fabric in the drawings, the surface layer is the first surface layer while the inner layer is the second surface layer. If the surface layer of the base fabric is polished whereby tiny velvet is formed on the surface while the inner layer is bonded to the resin layer, both surfaces of the artificial leather will look and touch like genuine leather, causing the artificial leather of the invention to be a perfect substitute for genuine leather; moreover, the artificial leather of the invention can be used for more purposes, and especially, when incorporated in an automotive seat, it can make the seat more comfortable. The artificial leather can be polished with a grinding wheel, sandpaper or any tools not specified herein, capable of forming velvet as described herein.

In embodiments of the invention, the resin layer may be a PU layer or PVC layer or a mixed layer of PU and PVC. If the resin layer is a PVC layer, the artificial leather will be more durable, tear-resistant, scratch-resistant and flame-resistant. Moreover, the resin layer may be provided with only one sublayer or a plurality of sublayers arranged in an orderly manner as laminates.

In one embodiment of the invention, the resin layer comprises an epidermal sublayer and an adhesive sublayer arranged in an orderly manner as two laminates, and the resin layer is bonded to the base fabric through the adhesive sublayer. In another embodiment of the invention, the resin layer comprises an epidermal sublayer, a foamed sublayer and an adhesive sublayer arranged in an orderly manner as three laminates, i.e., a foamed sublayer is added which differs from the above-referenced embodiment of the invention in this paragraph. In such an embodiment of the invention, the resin layer is still bonded to the base fabric through the adhesive sublayer, and simultaneously, the foamed sublayer gives the artificial leather buffering capacity, thus making the artificial leather more elastic. When incorporated in an automotive seat, it can further enhance the riding comfort. In an embodiment of the invention, wherein the resin layer is a PVC layer, the epidermal sublayer contains PVC resin, stabilizer, plasticizer, color paste and filler; the adhesive sublayer contains PVC resin, plasticizer and filler, etc.; the foamed sublayer contains PVC resin, plasticizer, color paste, filler and foaming agent. In an embodiment of the invention, wherein the resin layer is a PU layer, the epidermal sublayer contains PU resin, color paste and filler; the adhesive sublayer contains PU resin and filler, etc.; the foamed sublayer contains PU resin, color paste, filler and foaming agent, etc. Furthermore, the resin layer also comprises a surface treating agent sublayer, which is disposed on the side of the epidermal sublayer away from the base fabric. The resin layer can be formed first, and then the resin layer can be bonded to the base fabric. In an embodiment of the invention, the epidermal sublayer can be formed on base paper (such as release paper) and dried in an oven; then, a foamed sublayer is formed on the epidermal sublayer and dried in the oven; then, an adhesive sublayer is formed on the foamed sublayer and bonded to the well-woven base fabric; after that, the base fabric and the resin layer (with base paper) are baked in the oven; then, the base paper is separated from the artificial leather. Of course, the base paper can be recycled after separation.

The resin layer can be not only a PU (polyurethane) layer or a PVC (polyvinyl chloride) layer, but also another thermoplastic or thermosetting material layer, such as a polyolefin layer, halogenated polyolefin layer, polyacrylic acid layer, polypropylene ester layer, silicone rubber layer, polyether layer, polyester layer or polyamide layer. In an embodiment of the invention, wherein the resin layer comprises multiple sublayers, the material of each sublayer can be adjusted based on the material of the resin layer according to the afore-referenced embodiment of the invention.

Understandably, a particular requirement for the overall thickness of the artificial leather may be requested for an embodiment of the invention. Notably, the basic fabric will lack high sufficient mechanical properties if it is too thin; however, if the basic fabric is too thick, the resin layer will be too thin and therefore unable to meet customers' general requirements for artificial leather. In a preferred embodiment of the invention, the thickness ratio between the base fabric and the resin layer is equal to 0.7~2.0, such as 0.7, 0.71, 0.72, 0.75, 0.80, 0.85, 0.90, 0.91, 0.92, 0.95, 1.0, 1.1, 1.2, 1.4, 1.6, 1.8, 1.9 or 2.0. Preferably, the thickness ratio is set to 0.71~0.92, i.e., the thickness of the base fabric is lower than that of the resin layer, so that the mechanical properties of the artificial leather, such as tensile strength and tear resistance, can be enhanced while the general requirements for the thickness of the artificial leather are met.

In embodiments of the invention, the thickness of the base fabric is set to 0.4 mm~0.75 mm, such as 0.4 mm, 0.44 mm, 0.5 mm, 0.55 mm, 0.60 mm, 0.65 mm, 0.67 mm, 0.70, 0.72 mm or 0.75 mm. Preferably, the thickness of the base fabric is set to 0.5 mm-0.65 mm, which can be specifically achieved by adjusting the thickness of the warp yarns and weft yarns. Correspondingly, the thickness of the resin layer is set to 0.4 mm~1.0 mm, such as 0.4 mm, 0.45 mm, 0.5 mm, 0.56 mm, 0.6 mm, 0.65 mm, 0.68 mm, 0.69 mm, 0.70 mm, 0.71 mm, 0.72 mm, 0.73 mm, 0.75 mm, 0.8 mm, 0.87 mm, 0.92 mm, 0.97 mm or 1.0 mm. In a preferred embodiment of the invention, the thickness of the resin layer is set to 0.65 mm~0.75 mm.

It should be noted that the thickness of the base fabric and the thickness of the resin layer in embodiments of the invention are not completely limited to the numerical ranges referenced herein.

Figure 4:
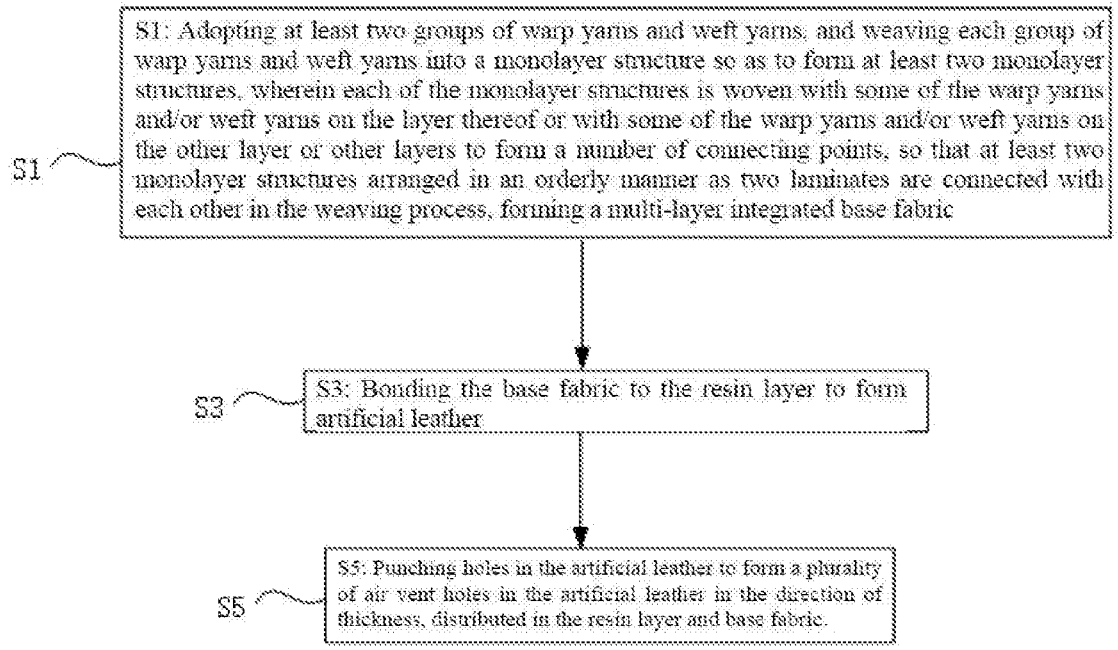
FIG. 4 shows a flow diagram of the preparation method for the artificial leather of the invention in accordance with one embodiment of the invention.

Additionally, the invention comprises a preparation method for artificial leather. The preparation method for artificial leather can be used to manufacture the artificial leather of the invention, as shown in FIG. 4, and the preparation method comprises the steps of:
S1: Weaving at least two groups of warp yarns and weft yarns together, and weaving each group of warp yarns and weft yarns into a monolayer structure to form at least two monolayer structures, wherein each monolayer structure is woven with some of the warp yarns and/or weft yarns in such layer or with some of the warp yarns and/or weft yarns in one or more other layers to form a number of connecting points so as to connect at least two monolayer structures together by a weaving method. Specifically, the various monolayer structures can be connected together through the above weaving method to form a multi-layer integrated base fabric;
S3: Bonding the base fabric to the resin layer to form artificial leather; specifically, the fabric layer can be bonded to the resin layer by one or more of the following: calendering, tape casting, extrusion, coating or dipping;
S5: Punching holes in the artificial leather to form a plurality of air vent holes in the artificial leather in the direction of thickness, distributed in the resin layer and base fabric. The specific method of providing air vent holes is in accordance with that method described herein.

The artificial leather produced by this manufacturing method has the various advantages and effects of the embodiments of artificial leather of the invention described herein. Such details are not repeated here.

In embodiments of the invention, such as those utilized in the context of practical applications, there is a spinning step before S1. That is, warp yarns and weft yarns are formed before weaving (i.e., S1 can also be referred to as "weaving"). Of course, warp yarns and weft yarns can be directly purchased in an already spun form.

Artificial leather with a brushed structure can be formed by the methods disclosed herein, as follows:

The first method: After the formation of a base fabric, polishing the base fabric first and then bonding it to the resin layer. Specifically, there is one more step between S1 and S3, as follows:
S2: Polishing one surface of the base fabric (i.e., the surface where the first surface layer faces away from the second layer) with a grinding wheel or file to form a base fabric with a brushed structure incorporated on one surface; therein, at least one of the warp yarns and the weft yarns in the monolayer structure (i.e., the first surface layer) where the brushed structure is located is formed of sea-island filaments;

In such an embodiment of the invention, S3 involves the following:

Bonding the other surface of the base fabric (i.e., the surface where the second surface layer faces away from the first surface layer) to form artificial leather.

The second method: After the formation of a base fabric, bonding the base fabric to the resin layer before polishing it. Specifically, there is one more step between S3 and S5, as follows:
S4: Polishing the non-bonded surface of the base fabric (the surface of the base fabric away from the resin layer, i.e., the first surface layer) to form a base fabric with brushed structure incorporated on one surface; therein, at least one of the warp yarns and the weft yarns in the monolayer structure where the brushed structure is located is formed of sea-island filaments.

Whether the base fabric is polished first and then bonded to the resin layer, or the base fabric is bonded to the resin layer first and then polished, a polishing technology is adopted in the invention to provide a brushed structure (or velvet structure) on one surface of the base fabric. As wet out herein, both sides of the artificial leather look and touch basically the same as genuine leather, making it easier to replace genuine leather with artificial leather of the invention and further expand the possible applications for such artificial leather. The polishing depth of the first surface layer is not limited in the invention, and such depth can be varied as needed. Polishing is bound to cause an excessively high rejection rate, making it difficult to control quality; moreover, it is not easy to operate during polishing. However, the base fabric in the invention is a multi-layer base fabric, wherein the warp yarns and weft yarns in different laminates form connecting points, through which they form a whole. The first surface layer is not sensitive to the amount of polishing undertaken, so it does not matter whether the polishing depth is large or small. Thus, even if the outermost monolayer structure is polished away, the overall performance of the base fabric can still meet the requirements due to the existence of the other monolayer structures. Therefore, the qualification rate of artificial leather can be greatly improved. Moreover, owing to the advantages set out herein, the base fabric is less difficult to polish, thus, the production efficiency of artificial leather of the invention can be increased.

In some embodiments of the invention, prior to S3, there may be a step of: Processing the spun, woven and even polished base fabric, and then bonding it to the resin layer; in an embodiment of the invention, wherein the base fabric is bonded to the resin layer first and then polished, the base fabric can be processed after polished.

In embodiments of the invention, different types of warp yarns and weft yarns may be used. See Embodiments 1~5 as set out in Table 1-4 below for the details of a comparison of the artificial leather of invention produced by the preparation method of the invention to the preparation of conventional prior art artificial leather with a monolayer structure (the "Comparative Prior Art"). The weft yarns were reinforced during the production of the artificial leather with a monolayer structure of the Comparative Prior Art. Then, the mechanical properties of the artificial leather in the Comparative Prior Art and Embodiment 1~5 were tested before and after hole-punching, respectively. The test results are shown in Table 1-4. It should be noted that in the tables, the extension direction of artificial leather (including the artificial leather with a monolayer structure in the Comparative Prior Art and the multi-layer artificial leather of the invention) is taken as the CrossDirection, while the direction perpendicular to the extension direction is the MachineDirection. The words "left" and "right" refer to two sides in the MachineDirection, respectively; the word "middle" refers to the middle in the MachineDirection; dimension N/3 cm refers to the maximum tensile force bearable to a sample that is 3 cm wide.

TABLE 1

| | | Tensile Strength (before hole-punching) | | | | | |
| | | CrossDirection: ≥280N/3 cm | | | MachineDirection: ≥180N/3 cm | | |
| Embodiments | Description\Standard | Left | Middle | Right | Left | Middle | Right |
| --- | --- | --- | --- | --- | --- | --- | --- |
| Comparative Prior Art | Weft reinforcement in monolayer structure | 723 | 720 | 717 | 690 | 692 | 672 |
| Embodiment 1 | Double-layer twill + satin (sea-island filaments + long fiber yarn DTY)_finished product | 1425 | 1383 | 1403 | 1635 | 1681 | 1660 |
| Embodiment 2 | Double-layer twill + satin (sea-island filaments + 40 staple yarns)_finished product | 1254 | 1373 | 1236 | 1389 | 1642 | 1131 |
| Embodiment 3 | Double-layer plain weave + satin (sea-island filaments + long fiber yarn DTY)_finished product | 1321 | 1363 | 1279 | 1645 | 1666 | 1684 |
| Embodiment 4 | Double-layer plain weave + satin (sea-island filaments + 40 staple yarns)_finished product | 1296 | 1294 | 1334 | 1493 | 1628 | 979 |
| Embodiment 5 | Double-layer plain weave + satin (sea-island filaments + 32 staple yarns)_finished | 1101 | 1065 | 1194 | 1083 | 1627 | 1722 |

TABLE 2

| | | Tear Resistance (before hole-punching) | | | | | |
| | | CrossDirection: ≥40N | | | MachineDirection: ≥30N | | |
| Embodiments | Description\Standard | Left | Middle | Right | Left | Middle | Right |
| --- | --- | --- | --- | --- | --- | --- | --- |
| Comparative Prior Art | Weft reinforcement in monolayer structure | 42 | 44 | 46 | 41 | 37 | 35 |
| Embodiment 1 | Double-layer twill + satin (sea-island filaments + long fiber yarn DTY)_finished product | 86 | 92 | 88 | 60 | 63 | 61 |
| Embodiment 2 | Double-layer twill + satin (sea-island filaments + 40 staple yarns)_finished product | 82 | 83 | 82 | 61 | 57 | 61 |
| Embodiment 3 | Double-layer plain weave + satin (sea-island filaments + long fiber yarn DTY)_finished product | 71 | 73 | 73 | 65 | 63 | 65 |
| Embodiment 4 | Double-layer plain weave + satin (sea-island filaments + 40 staple yarns)_finished product | 63 | 60 | 65 | 64 | 63 | 64 |
| Embodiment 5 | Double-layer plain weave + satin (sea-island filaments + 32 staple yarns)_finished | 109 | 117 | 110 | 68 | 70 | 64 |

TABLE 3

| | | Tensile Strength (after hole-punching) | | | | | |
| | | CrossDirection: ≥280N/3cm | | | MachineDirection: ≥180N/3cm | | |
| Embodiments | Description\Standard | Left | Middle | Right | Left | Middle | Right |
| --- | --- | --- | --- | --- | --- | --- | --- |
| Comparative Prior Art | Weft reinforcement in monolayer structure | 262 | 171 | 216 | 174 | 258 | 169 |
| Embodiment 1 | Double-layer twill + satin (sea-island filaments + long fiber yarn DTY)_finished product | 458 | 373 | 447 | 427 | 372 | 355 |
| Embodiment 2 | Double-layer twill + satin (sea-island filaments + 40 staple yarns)_finished product | 386 | 470 | 452 | 302 | 344 | 340 |
| Embodiment 3 | Double-layer plain weave + satin (sea-island filaments + long fiber yarn DTY)_finished product | 427 | 490 | 420 | 300 | 422 | 311 |
| Embodiment 4 | Double-layer plain weave + satin (sea-island filaments + 40 staple yarns)_finished product | 422 | 365 | 504 | 302 | 258 | 169 |
| Embodiment 5 | Double-layer plain weave + satin (sea-island filaments + 32 staple yarns)_finished | 511 | 464 | 469 | 489 | 473 | 253 |

TABLE 4

| | | Tear Resistance (after hole-punching) | | | | | |
| | | CrossDirection: ≥40N | | | MachineDirection: ≥30N | | |
| Embodiments | Description\Standard | Left | Middle | Right | Left | Middle | Right |
| --- | --- | --- | --- | --- | --- | --- | --- |
| Comparative Prior Art | Weft reinforcement in monolayer structure | 36 | 47 | 39 | 32 | 37 | 32 |
| Embodiment 1 | Double-layer twill + satin (sea-island filaments + long fiber yarn DTY)_finished product | 62 | 52 | 71 | 50 | 49 | 54 |
| Embodiment 2 | Double-layer twill + satin (sea-island filaments + 40 staple yarns)_finished product | 42 | 44 | 45 | 51 | 52 | 54 |
| Embodiment 3 | Double-layer plain weave + satin (sea-island filaments + long fiber yarn DTY)_finished product | 69 | 78 | 58 | 65 | 58 | 56 |
| Embodiment 4 | Double-layer plain weave + satin (sea-island filaments + 40 staple yarns)_finished product | 47 | 47 | 40 | 62 | 65 | 54 |
| Embodiment 5 | Double-layer plain weave + satin (sea-island filaments + 32 staple yarns)_finished | 56 | 70 | 42 | 64 | 51 | 53 |

As is clearly shown in tables herein, the tensile strength and tear resistance of the artificial leather of the invention are much higher than in the Comparative Prior Art both before and after hole-punching. Furthermore, only artificial leather made of a two layer multi-layer base fabric is listed in Embodiment 1-5, but its mechanical properties are so good, it is conceivable that artificial leather made of a three-layer or more-layer base fabric must have much better mechanical properties. Therefore, after structural optimization, a multi-layer base fabric can be used to solve the problem of great mechanical property loss and poor stability caused by hole punching in monolayer artificial leather. It can replace existing genuine leather fabrics, thereby producing good social benefits. Moreover, compared with genuine leather fabrics, multi-layer artificial leather has a great cost advantage, which enables it to be used for more purposes.

The invention also provides an automobile that incorporate an automotive seat that incorporates the artificial leather of the invention, as disclosed herein.

Those skilled in the art will recognize that under the premise of no contradiction, the embodiments of the invention disclosed herein can be freely combined together or superimposed over one another.

The embodiments of the present invention disclosed herein are provided as exemplary embodiments only, and are not restrictive embodiments. Any obvious or equivalent modification or replacement of the above details made by those skilled in the art without deviating from the basic principles of the invention will be included in the scope of the present invention.

The invention claimed is:
1. An artificial leather comprising:
a resin layer as a surface;
a base fabric connected to the resin layer as a substrate, wherein the base fabric comprises at least two monolayer structures arranged in an orderly manner as two laminates, each monolayer of the at least two monolayer structures having a warp yarn and a weft yarn, each monolayer of the at least two monolayer structures being woven from the warp yarns and weft yarns in such layer, each of the at least two monolayer structures being woven with some of the warp yarns and/or weft yarns in such layer or with some of the warp yarns and/or weft yarns in one or more other of the at least two monolayer structures to form a number of connecting points, whereby at least two monolayer struc- tures arranged in an orderly manner as two laminates are connected with each other, whereby a multi-layer integrated base fabric is formed; and one or more air vent holes formed in the artificial leather and distributed in the resin layer and the base fabric in the direction of thickness of the artificial leather.

2. The artificial leather of claim 1, wherein the warp yarns and weft yarns in each of the monolayer structures form one or more of the following: plain weave structure, twill weave structure and satin weave structure.

3. The artificial leather of claim 1, wherein the warp yarns and weft yarns are each one of the following: polyester yarns and CVC yarns.

4. The artificial leather of claim 1, wherein the warp yarns and weft yarns are made of at least one of the following: sea-island filaments, 32 staple yarns, 40 staple yarns and long fiber yarn DTY.

5. The artificial leather of claim 1, wherein the outermost monolayer structure in the base fabric positioned farthest away from the resin layer being the first surface layer, and the innermost outermost monolayer close to the resin layer being the second surface layer, and at least one of the warp yarns and weft yarns in the first surface layer are made of sea-island filaments, and the base fabric is provided with a brushed structure on one side of the first surface layer; and the resin layer is bonded to the second surface layer.

6. The artificial leather of claim 1, wherein the base fabric comprises two or three monolayer structures.

7. The artificial leather of claim 1, wherein the resin layer is one of the following: a PVC layer, a PU layer, a polyolefin layer, a halogenated polyolefin layer, a polyacrylic acid layer, a polypropylene ester layer, a silicone rubber layer, a polyether layer, a polyester layer or a polyamide layer.

8. The artificial leather of claim 1, wherein the thickness ratio between the base fabric and the resin layer is about 0.7 to about 2.0.

9. The artificial leather of claim 8, wherein the thickness of the base fabric is about 0.4 mm to about 0.75 mm.

* * * * *